United States Patent [19]

Bibl et al.

[11] Patent Number: 4,801,970
[45] Date of Patent: Jan. 31, 1989

[54] DEVELOPMENT APPARATUS FOR LATENT IMAGES ON SUPPORTED SHEETS

[75] Inventors: Andreas Bibl, Los Altos; Gene F. Day, Hillsborough, both of Calif.

[73] Assignee: Precision Image Corporation, Redwood City, Calif.

[21] Appl. No.: 930,655

[22] Filed: Nov. 10, 1986

Related U.S. Application Data

[63] Continuation-in-part of Ser. No. 796,872, Nov. 12, 1985, Pat. No. 4,655,165, which is a continuation-in-part of Ser. No. 763,040, Aug. 6, 1985.

[51] Int. Cl.$^4$ ............................................. G03G 15/10
[52] U.S. Cl. ..................................... 355/10; 118/647; 118/659
[58] Field of Search ................ 355/3 R, 10; 118/645, 118/647, 659, 660; 430/117, 118, 119; 346/155, 157; 354/317

[56] References Cited

U.S. PATENT DOCUMENTS

| | | | |
|---|---|---|---|
| 2,824,545 | 2/1958 | Ricker | 118/647 |
| 3,176,653 | 4/1965 | Hansen | 118/647 |
| 3,656,173 | 4/1972 | Fussel | 118/659 X |
| 3,929,099 | 12/1975 | Szymber et al. | 355/10 X |
| 4,013,356 | 3/1977 | Bestenreiner et al. | 355/10 |
| 4,198,923 | 4/1980 | Blumenthal | 118/660 |
| 4,259,005 | 3/1981 | Kuehnle | 355/10 |
| 4,270,859 | 6/1981 | Galbraith et al. | 355/10 |
| 4,482,242 | 11/1984 | Moraw et al. | 355/10 |
| 4,693,206 | 9/1987 | Day | 118/660 X |
| 4,706,605 | 11/1987 | Bibl et al. | 118/660 X |

Primary Examiner—Fred L. Braun
Attorney, Agent, or Firm—Thomas Schneck

[57] ABSTRACT

A toning shoe for applying fluid developer to a latent image on a supported sheet. A drum is the preferred support, with the toning shoe having raised upstream and downstream support rims contacting the sheet, opposed lateral insulating rims spaced very slightly from the sheet and a recessed electrode further spaced from the sheet. Fluid developer is injected through a slit into the shoe, flows as a thin film between the electrode and the sheet and then passes through a drain for collecting and recycling. The shoe moves laterally as the drum rotates so that development occurs in a helical stripe pattern.

7 Claims, 6 Drawing Sheets

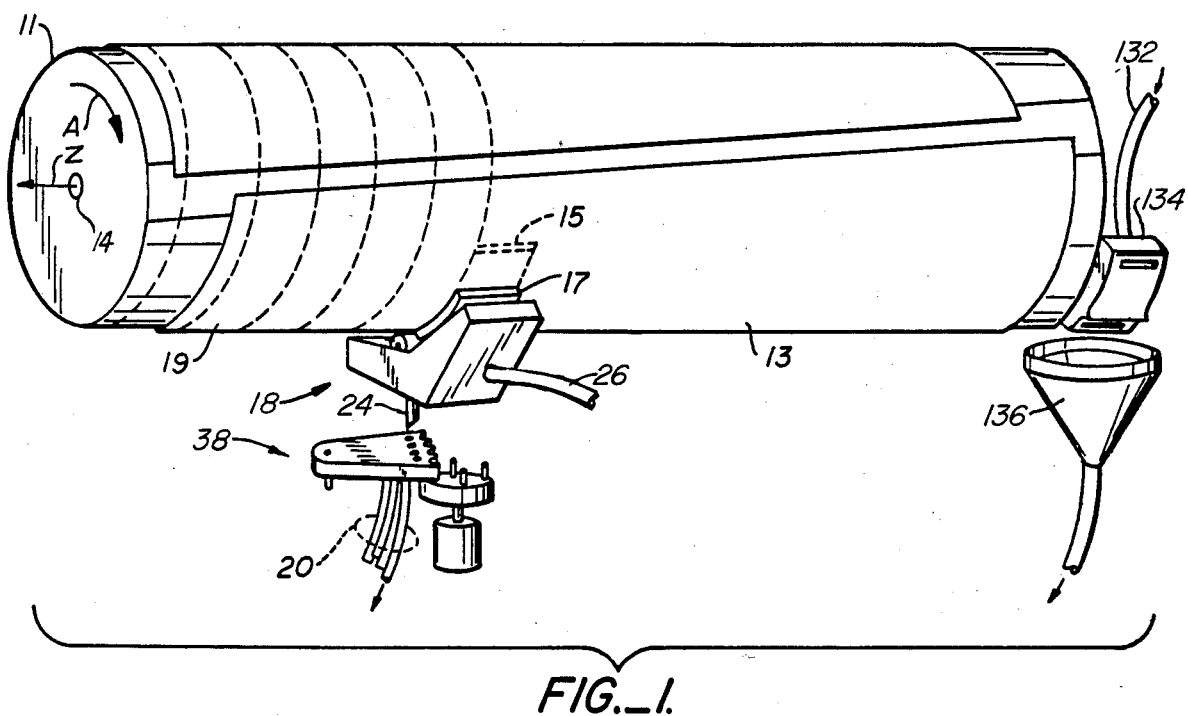
FIG._1.
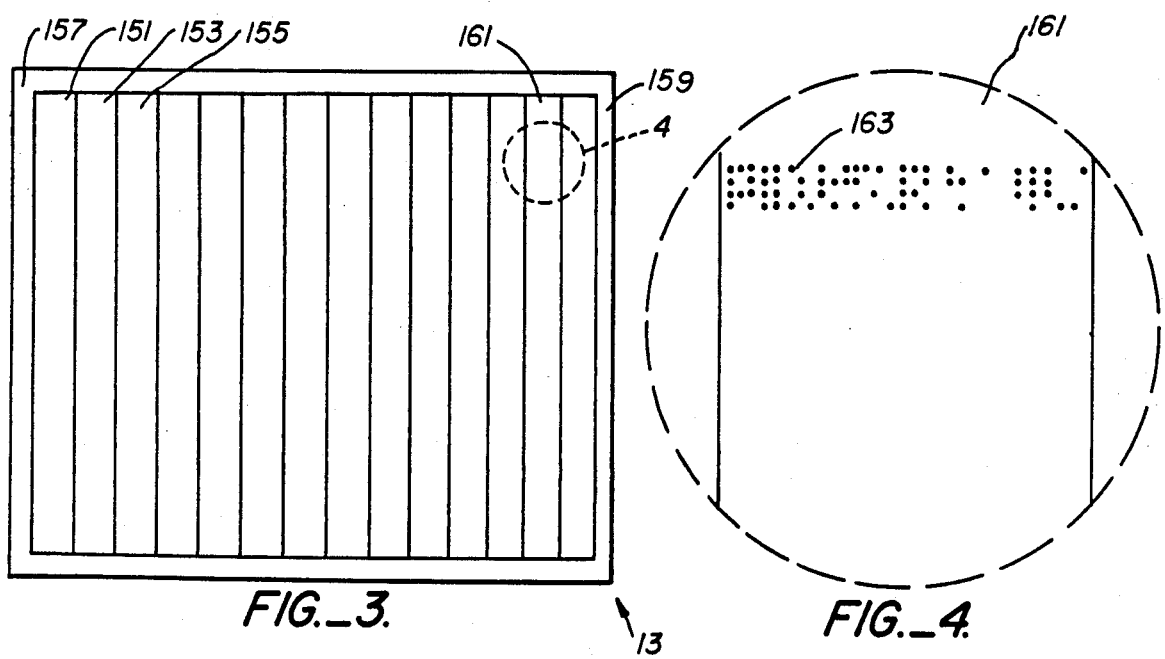
FIG._3.  FIG._4.
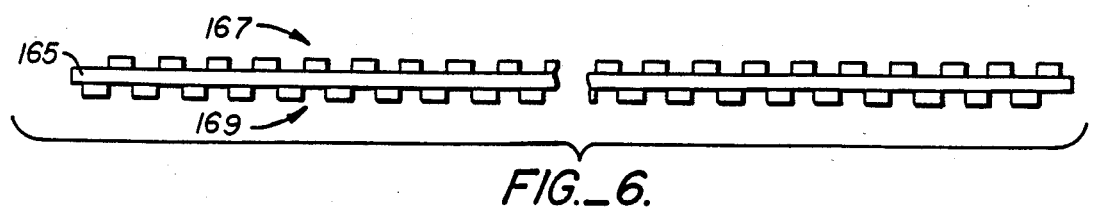
FIG._6.

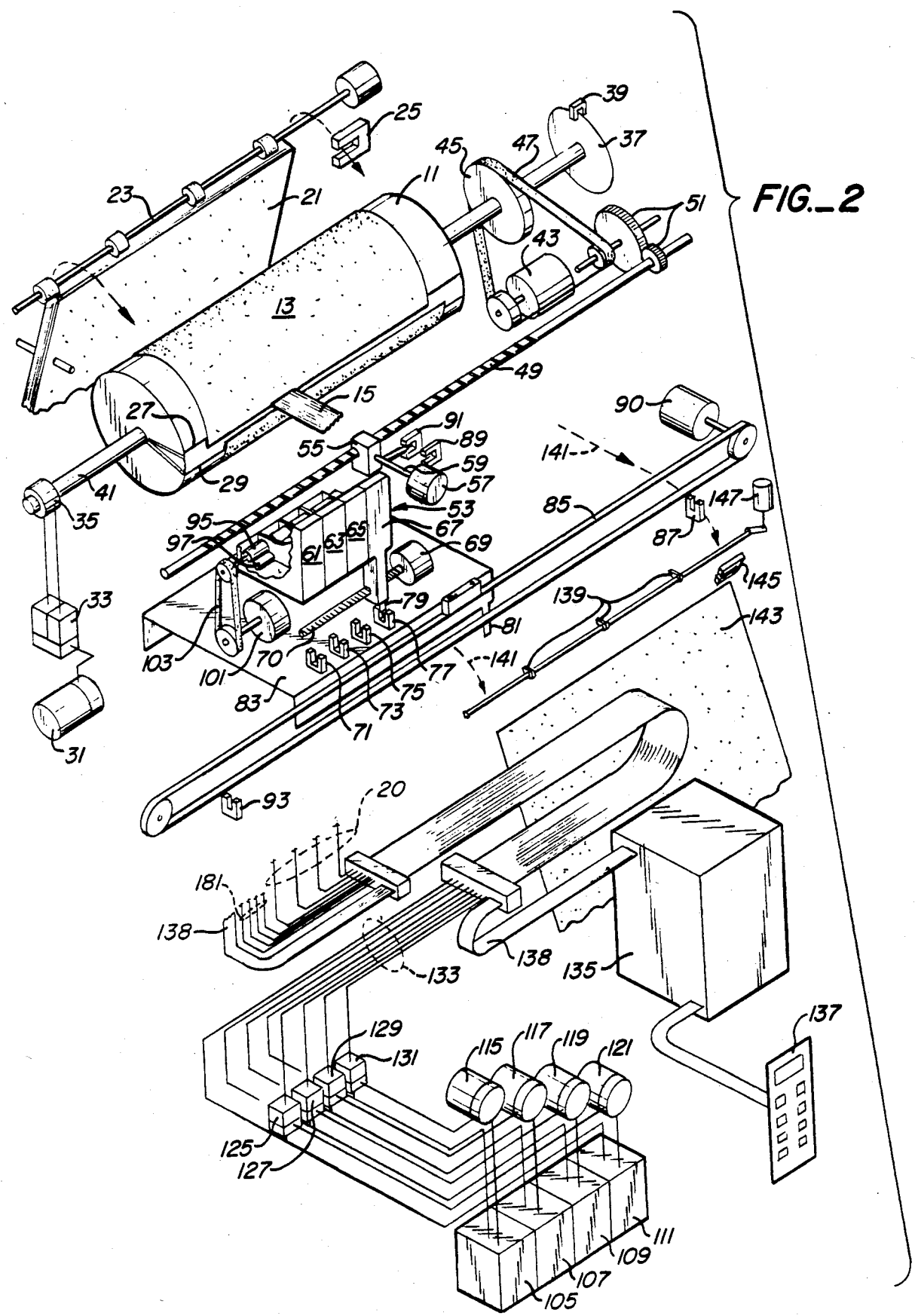

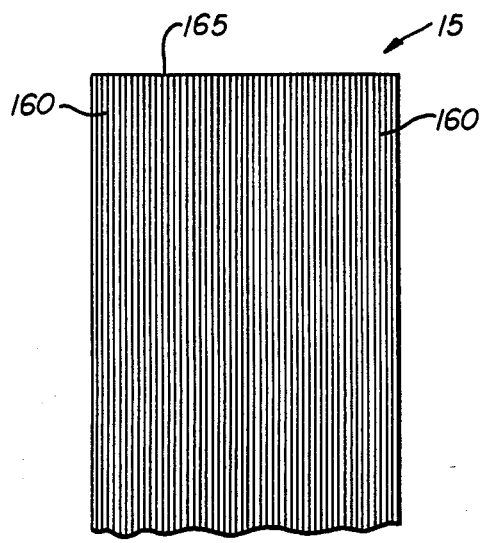
FIG._5.
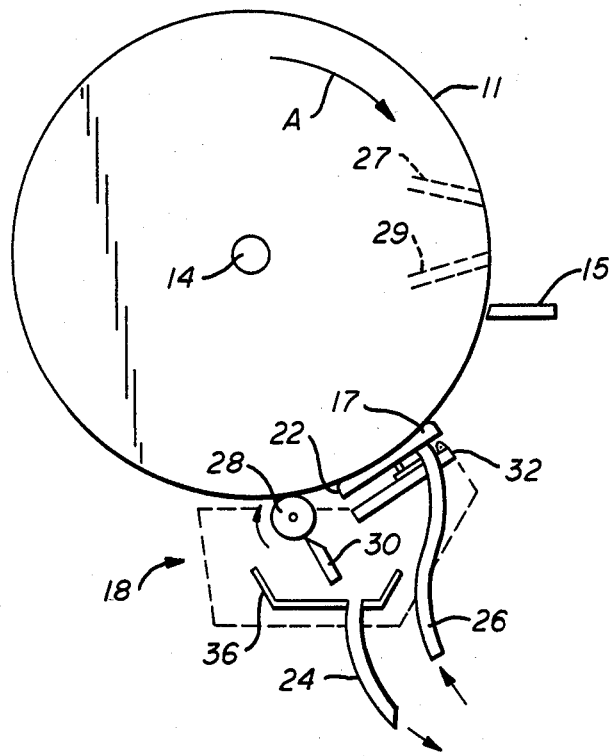
FIG._7.
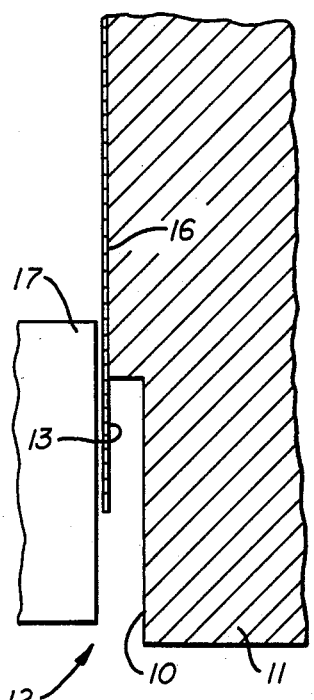
FIG._8.
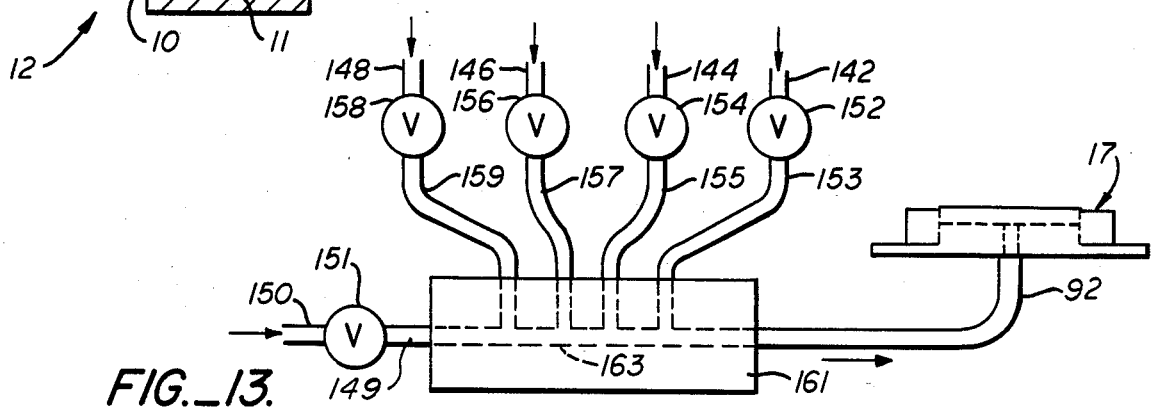
FIG._13.

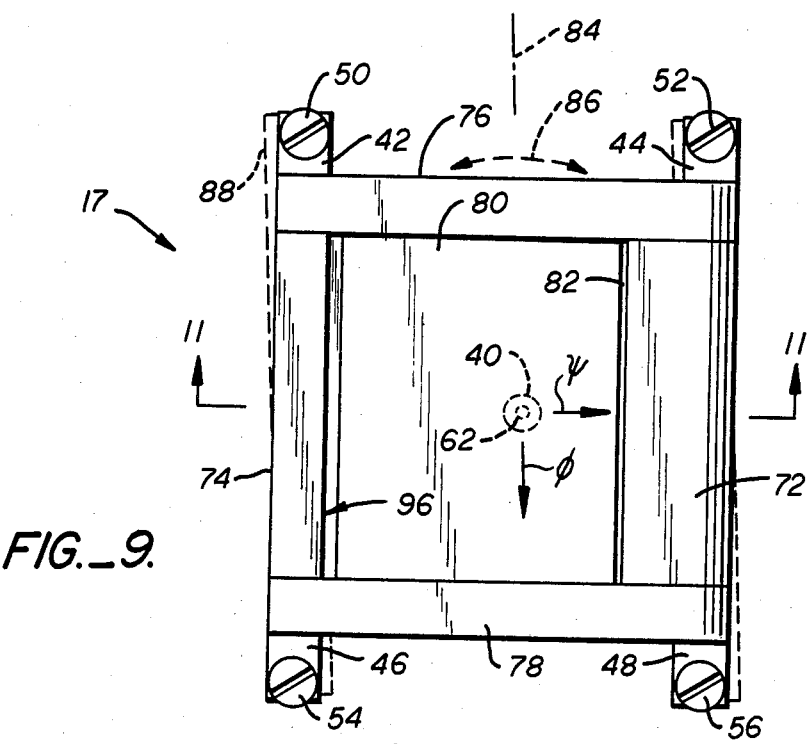
FIG._9.
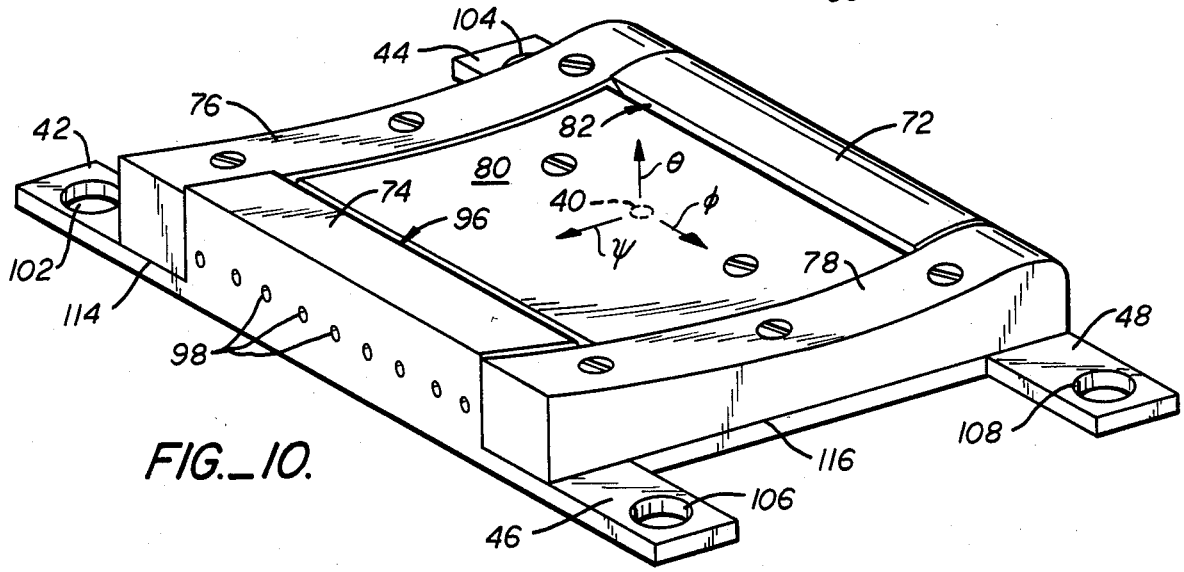
FIG._10.
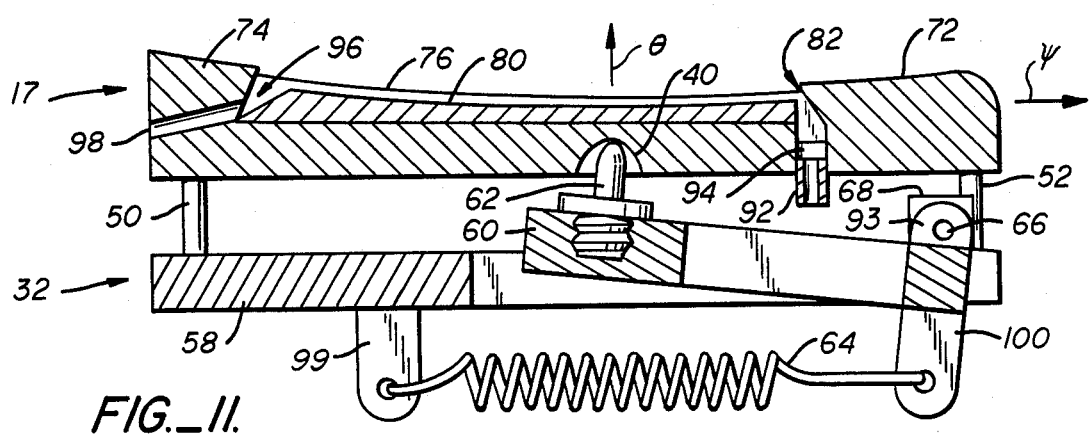
FIG._11.

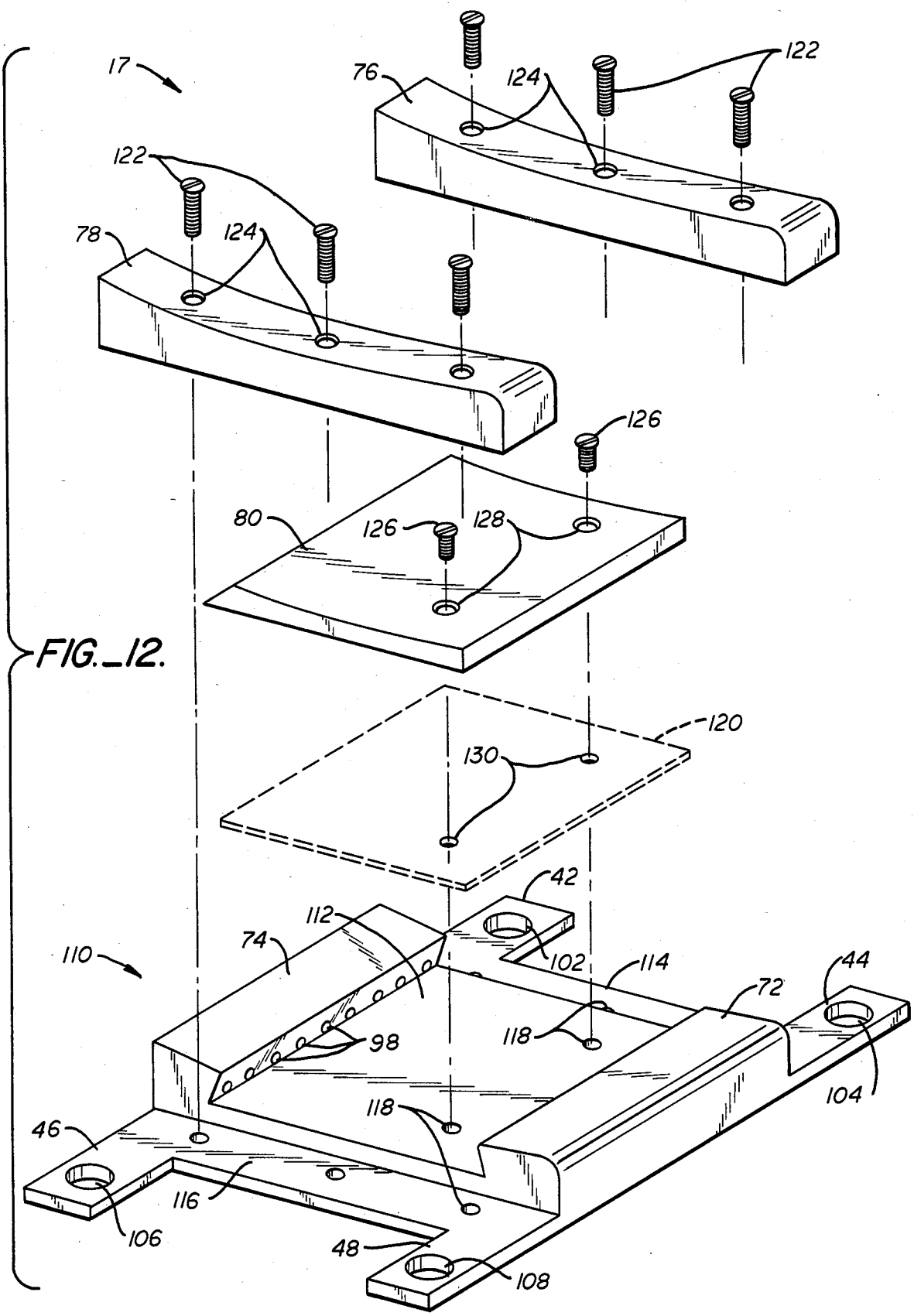

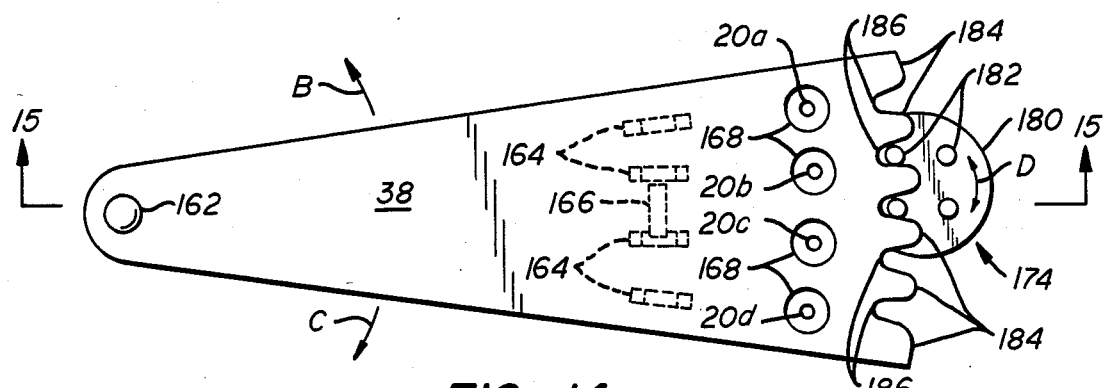
FIG._14.
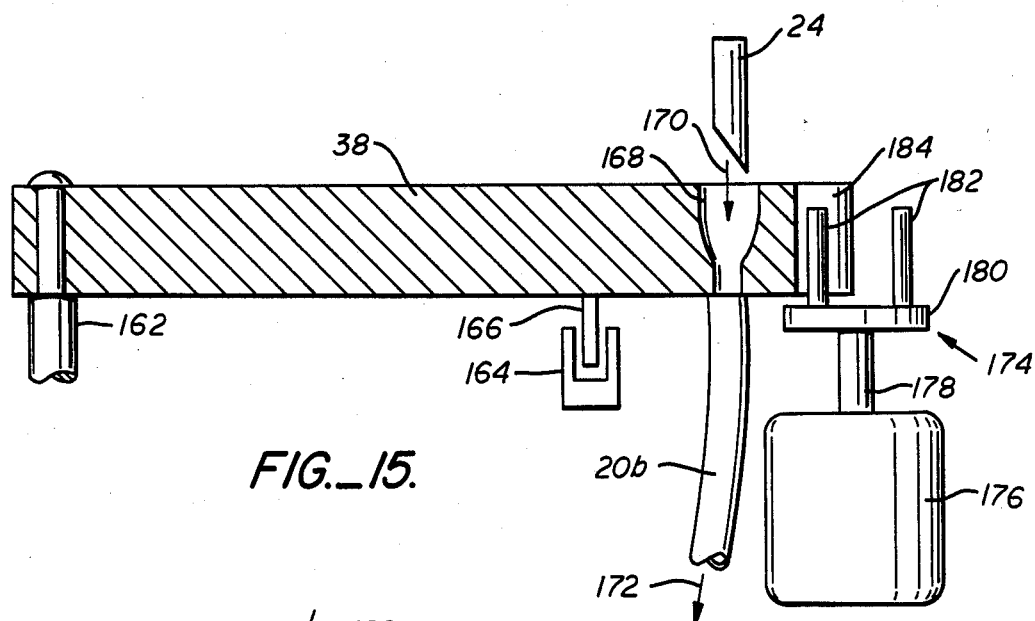
FIG._15.
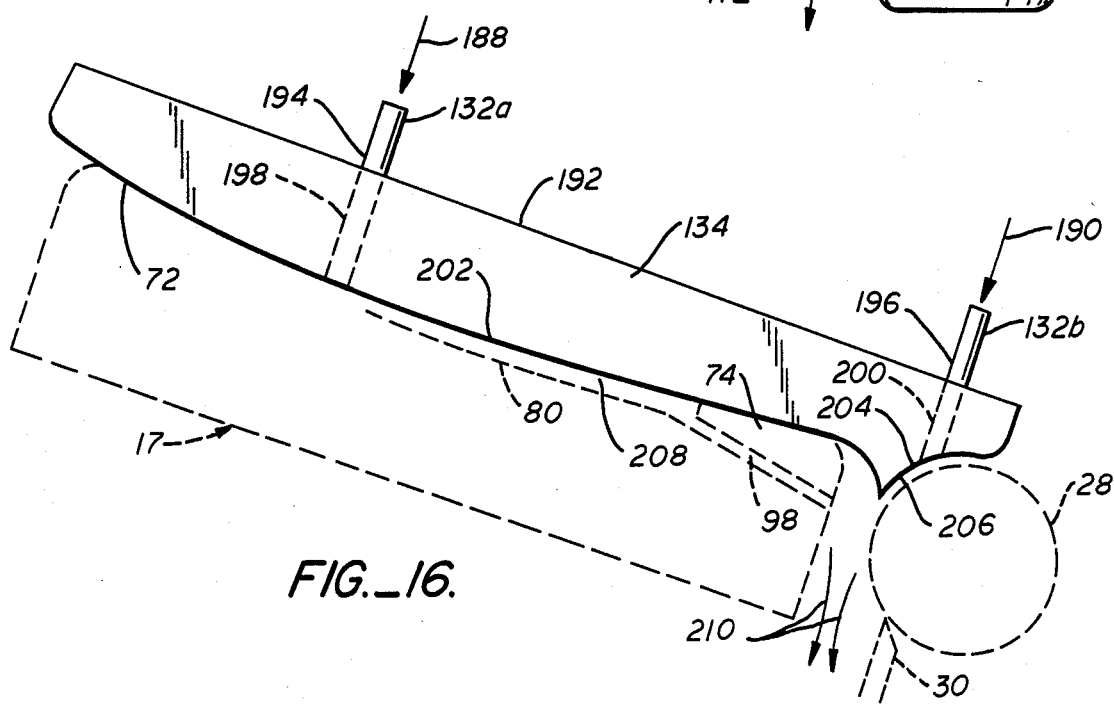
FIG._16.

DEVELOPMENT APPARATUS FOR LATENT IMAGES ON SUPPORTED SHEETS

CROSS REFERENCE TO RELATED APPLICATION

This application is a continuation-in-part of U.S. patent application Ser. No. 796,872 filed Nov. 12, 1985 now U.S. Pat. No. 4,655,165, which is a continuation-in-part of U.S. patent application Ser. No. 763,040, filed Aug. 6, 1985.

TECHNICAL FIELD

The invention relates to developing of latent images and more particularly to a structure for applying a fluid developer to supported sheets in order to develop a latent image into a visible image.

BACKGROUND ART

In electrostatic drum printing on sheets, such as in facsimile machines, an electrostatic latent image on the sheets is developed into a visible image, usually by applying a liquid suspension of toner particles to the sheets. The developer typically must remain in contact with the sheets for about one second to obtain an adequate image contrast. Attempts have been made to increase the rate of printing by increasing the speed of rotation of the drum. However, this sometimes results in a loss of image contrast or density.

In U.S. Pat. No. 4,482,242 to Moraw et al., a latent charge image on a drum is developed by moving the drum through a pool of developer liquid in a developing shoe. The excess liquid is removed by spillage off the edges of the shoe, and by a fast moving roller contacting the drum.

U.S. Pat. No. 4,270,859 to Galbraith et al. provides a pre-wet shoe for depositing a liquid dispersant onto photoconductive paper before development, and a toner shoe adjacent to the paper for applying toner to a latent image on the paper. Toner is applied across the width of an entire sheet. The toner fluid flows in the shoe to the paper, then downhill along the paper to an outlet of the shoe. The toning shoe is raised by a lifting mechanism to a prescribed distance from the drum surface, and the shoe does not contact the drum.

In copending U.S. application Ser. No. 763,040 assigned to the assignee of the present invention, a drum printer features a print element or head with a linear array of closely spaced charging elements for writing an electrostatic latent image helical stripe pattern on a sheet mounted on a drum. When the sheet is laid out, the stripe pattern consists of adjacent columns of digital multi-bit words forming an image. Such print heads are faster than those which only print a single helical raster line at a time, yet without the expense involved with full width line printer heads.

It is desirable to devise a development electrode that allows the use of a print head with helical stripe scanning thereby obtaining a faster printing speed. An even faster print speed could be obtained if the time of fluid developer contact with the sheet could be reduced to less than a full second. However, it is imperative that vital image contrast not be lost. Also streaking and uneven developing must be avoided.

An object of the invention is to devise a developer applicator for a supported latent image, particularly a structure which allows rapid helical stripe pattern printing without streaking or uneven imaging at stripe edges.

DISCLOSURE OF THE INVENTION

The above object has been met with a developer applicator structure, called a "toning shoe", which applies a flowing stream of fluid developer to a supported sheet having a latent image thereon. In the case of a drum-supported sheet, the shoe is made to scan the sheet in a helical stripe pattern. The toning shoe has raised upstream and downstream metal rim support surfaces which contact the imaging surface, raised arcuate insulating lateral rims near opposed lateral edges of the stripe which are slightly relieved so as to not quite touch the sheet, and a central recessed electrode area very closely spaced from the sheet. The shoe has a slit near the leading upper edge of the shoe for injecting fluid developer under pressure in the space between the sheet and the recessed area of the shoe. Developer flows toward a drain channel and drain ports defined in the lower rim support surface of the shoe to a sump for recycling.

One advantage of the present invention is that fluid developer or toner is applied to a localized area during drum rotation, corresponding to a helical column or helical stripe. The raised lateral rims, though slightly out of contact with the sheet to prevent streaking, still effectively confine the toner to the stripe being developed. The upstream and downstream rim support surfaces provide that the recessed area is very closely spaced from the sheet. This close spacing increases the deposition of developer so that only brief developer contact is needed to develop the latent image to the desired intensity. The shoe is physically simple so it is inexpensive and can be easily cleaned by periodically wiping it off. A number of shoes applying different developers, one for each primary color, may be used to develop color images.

For developing electrostatic latent images on a sheet the recessed area is an electrode, while raised edges are insulating structures. The fluid developer is then a liquid toner.

As the drum rotates, the toning shoe is moved laterally parallel to the drum axis with the shoe contacting the supported sheet so that developer flowing in the shoe is directly applied to the sheet. A helical stripe, scanning pattern results.

BRIEF DESCRIPTION OF THE DRAWINGS

FIG. 1 is a simplified perspective view of a drum supported sheet and toning shoe in accord with the present invent FIG. 2 is an exploded detailed plan perspective view of a four shoe printer apparatus employing toning shoes of the invention.

FIG. 3 is a layout view of a sheet illustrating the scanning pattern of the apparatus of the present invention.

FIG. 4 is a detail of the sheet illustrated in FIG. 3;

FIG. 5 is a partial top view of a scanning head employed in the printer of FIG. 2.

FIG. 6 is a magnified front edge view of the scanning head illustrated in FIG. 5.

FIG. 7 is a side plan view of a sheet-supporting, rotating drum with a print head and toning shoe.

FIG. 8 is a sectional view of an edge of the drum of FIG. 7, with a sheet supported thereon and a toning shoe adjacent to the sheet.

FIG. 9 is a front plan view of a toning shoe of the present invention.

FIG. 10 is a front perspective view of the toning shoe illustrated in FIG. 9.

FIG. 11 is a side sectional view of the toning shoe in FIG. 9 with a shoe biasing mechanism in accord with the present invention.

FIG. 12 is an exploded perspective view of the toning shoe illustrated in FIG. 9.

FIG. 13 is a simplified side view of a toner selection valve unit for use with a toning shoe of the resent invention.

FIG. 14 is a top plan of a drain selector foot in accord with the present invention.

FIG. 15 is a side sectional view taken along the line 15—15 in FIG. 14.

FIG. 16 is a side plan view of a cleaning station in accord the present invention engaging the toning shoe of FIG. 9, shown in phantom, and a drying roller, also shown in phantom.

BEST MODE FOR CARRYING OUT THE INVENTION

The preferred embodiment of the invention involves toning of an electrostatic latent image on a sheet. However, other latent images, in non-electrostatic media, could also be developed. For non-electrostatic media, the electrodes described herein would not be needed.

With reference to FIG. 1, drum 11 may be seen supporting a sheet of paper 13 for rotation. An axle 14 located on the longitudinal axis Z through the center of drum 11 supports the drum and transmits rotational power from a motor, not shown. While the drum rotates in the direction of arrow A, its axle 14 is fixed and so the drum does not translate laterally, only rotationally. An electrostatic head, for creating an electrostatic latent image, is in contact with the paper 13 at location 15. The head is translated laterally, parallel to the longitudinal axis Z of the drum 11. The head has a forward edge in contact with the sheet 13, with a linear array of 1024 wires forming charging elements in very close proximity to the sheet 13. The number of wires may range between 100 and 10,000. Sheet 13 is coated so that it is a charge retaining dielectric medium. Such sheets are commercially available, for example "Electrographic Paper" sold by Crown Zellerbach Corporation. The drum operates at electrical ground or at a positive potential. The charging elements are at a negative potential of 400 to 600 volts relative to the drum. Polarities may be reversed. No electrical current is intended to flow through the paper coating.

A toning shoe 17, part of a toning shoe assembly 18, following head at location 15, applies liquid toner to the latent image existing in the charge pattern deposited onto the sheet for developing the image. The head and toning shoe move together laterally and continuously so that a helical stripe pattern 19, indicated by dashed lines, is traced on sheet 13 by the relative motion of the head and shoe on the one hand and the drum on the other hand. Developer is supplied to toning shoe 17 through an inlet tube 26, and toning shoe 17 supplies fluid developer or toner locally to the sheet on the stripe 19. A drying roller is used downstream of the toning shoe to remove excess developer from the sheet. Excess developer is collected by a sump in toning shoe assembly 18 and returned to the appropriate supply of color developer via a drain tube 24, a drain selector foot 38 and one of a set of return lines 20. Selector foot 38 pivots so that the appropriate one of the return lines 20 is under drain tube 24. The operation of drain selector foot 38 is discussed in greater detail below with reference to FIGS. 14 and 15. Alternatively, four toning shoes, each with its own supply of color developer and its own return line, may be provided as discussed below with reference to FIG. 2.

Also shown in FIG. 1 is a cleaning station 134 located just past the right edge of drum 11 for rinsing the toning shoe assembly 18 after each scan of a sheet 13. Cleaning solvent, such as ISOPAR is supplied through a tube 132 to cleaning station 134 where it is squirted onto toning shoe 17. The solvent removes waste developer from toning shoe 17 and drains into a funnel 136 where it is returned via a tube at the base of funnel 136 to a solvent supply tank. Supply tube 132 may include a particle filter for removal of colored particles and other foreign matter from the cleaning solvent. ISOPAR is a registered trademark of Exxon Co. for a narrow-cut isoparaffinic petroleum solvent consisting predominantly of $C10$ and $C11$ isoparaffinic hydrocarbons. Other solvents may also be used.

A printer employing such a toning shoe may be seen in more detail in FIG. 2. A sheet from a feeder 21 is driven by supply roller 23 through an optical sensor 25 onto drum 11. An optical sensor consists of a light transmitter and detector, separated by a narrow space. When the light beam is interrupted, the sensor is activated. The purpose of optical sensor 25 is to time the position of the edge of the sheet when a sheet first passes through the sensor. It is important to time the sheet so that the proper position of the drum can be made available to receive the sheet.

The drum may have a pair of vacuum channels 27 and 29 which are passages embedded in the drum having pumped apertures for holding sheet 13. Preferably, the channels should be spaced to secure the top and bottom edges of a sheet. The channels are evacuated by means of a vacuum pump 31 having suction controlled by solenoids 33 which is connected through a vacuum collar 35 to the two channels 27 and 29. The first vacuum channel 27 is used to secure the top of a sheet while the other channel secures the bottom. Thus, the top channel 27 must be in approximately a 12 o'clock position to receive a sheet coming through sensor 25. The position of the drum is known from an optical encoder 37 which is a film disk having a plurality of black and clear radial stripes thereon. The marks are read by another optical sensor 39.

The diameter o drum 11 is typically about 11¾ inches (29.8 cm) and its width is wider than sheets to be supported. The edge of the drum, extending from slightly inside the region of where paper is to be supported may be slightly relieved to prevent edge wetting when using fluid developers. The drum is rotated about its axial shaft 41 by means of a continuously rotating motor 43 turning pulley 45 by means of belt 47. Motor 43 also turns a lead screw 49 by means of gears 51. Lead screw 49 carries the head 15 as well as toner shoe assembly 53 and platform 83. Head 15 and toner shoe assembly 53 are supported on a carrier assembly, not shown, which is connected to lead screw 49 by means of a retractable half nut 55. A solenoid 57 provides motion to an arm 59 which retracts half nut 55 from lead screw 49 on command. In the retracted position, no motion is imparted to the head, toning shoe assembly and platform by the lead screw. The retracted position is used for flyback, discussed below. At another command the solenoid 57 causes the half nut to come back into contact with the lead screw, thereby again providing motion to both the head and the toning shoe.

The toning shoe assembly 53 in FIG. 2 consists of four individual toning shoes 61, 63, 65 and 67. Each shoe is approximately the same width as the head 15. A motor 69 turns another screw 70, placing a selected toning shoe directly beneath head 15. Different shoes carry different color developers whereby a selected toning color may be dispensed from a toning shoe indexed to a position below the head by screw 70. A series of optical sensors 71, 73, 75, 77 senses the position of a flag 79 extending from one of the toning shoes 67. The flag indicates the position of the toning shoes relative to the head. An optical sensor consists of a light transmitter and detector, separated by a narrow space. When the light beam is interrupted, the sensor is activated. Thus, when the flag 79 passes through a sensor the position of toning shoe 67 is known. Since the other toning shoes are fixed in relation to toning shoe 67, their positions are also known.

As mentioned, each shoe applies a different color of toner to an image. For example, the toning shoe 61 may be the first toning shoe which is used and is directly centered below electrostatic head 15. This shoe may contain a toner which supplies a yellow color to the latent image. The second toning shoe 63 may supply a magenta color, a third toning shoe 65 may supply a cyan color and a fourth toning shoe 67 may supply a black color. In the position shown in FIG. 2 the yellow toning shoe 61 would be directly below head 15. After one complete scan of sheet 13 by the head 15 by movement along the lead screw 49 from left to right, the toning shoe assembly is indexed to the left so that the second toning shoe, 63, carrying a magenta developer, is below head 15. Thus, the shoe assembly 53 successively supplies yellow, magenta, cyan and black liquid developer to the latent image to produce a visible color image. The order in which the colors are successively applied may differ from the above.

With half nut 55 in contact with lead screw 49, the shoe assembly 53 moves to the right as head 15 scans paper on rotating drum 11. Drum rotation is at about 10 to 20 rpm. When the head reaches the right hand edge of the paper, this is detected by a flag 81 extending from platform 83 on which the shoe assembly 53 is riding. The entire assembly is being driven by half nut 55. Although the platform is connected to belt 85, the belt is not driven until the flag 81 projects into the optical sensor 87. When this occurs, half nut 55 is retracted from lead screw 49 by solenoid 57 and the retracted position is sensed by an optical sensor 89. In the retracted position, the head 5 and shoe assembly 53 are no longer driven. At this time, flyback motor 90 is energized and belt 85 is caused to move in the opposite direction, carrying platform 83, shoe assembly 53 and head 15 back to an initial position. The arrival of platform 83 at this initial position is sensed by optical sensor 93 sensing the flag 81. When this occurs, the solenoid 57 advances arm 59 until the optical sensor 91 senses the forward position of the arm, at which half nut engages lead screw 49.

In FIG. 2, the position of the toner shoe appears shown somewhat removed from the drum. The actual position of the toning shoe is one very closely spaced to the sheet 13, a central electrode portion of the shoe being separated from the paper by only a few mils. Each toning shoe carries a drying roller, such as roller 95, which removes about 99 percent of the excess fluid from the sheet 13. A wiper blade 97 removes excess fluid from the wiper roller 95. The remaining one to three microns of fluid on the sheet evaporates in five to twenty seconds. The roller 95 is powered by motor 101 transmitting rotary force through belt 103. Fluid developer or toner is supplied to the toning shoes from supply tanks 105, 107, 109 and 111. Pumps 115, 117, 119 and 121 transmit developer through solenoid valves 125, 127, 129 and 131 into flexible conduit 133 which goes to developer shoes 61–67. Each valve is a solenoid which operates at about 5 pounds per square inch of fluid pressure. Each of the supply tanks 105–111 contains a color developer or toner corresponding to the colors of toner in shoes 61–67. Drain lines as shown return the spent toner to the appropriate supply tank.

An electrical control box 135 receives a block of digital data consisting of bits to be printed on a sheet. An operator may initiate printing through a control panel 137. The control box 135 divides the block of digital bits to be printed into columns to be sequentially transmitted to the printer one after another so that printing appears to be in the form of helical scanning of the paper, with one column continuously fed after another. A momentary pause in printing may be used in going from one column to the next at the top and bottom of a page where margins may exist or a gap in the wrap of a sheet about the drum. This may be achieved by turning valves 125, 127, 129 and 131 on and off and by interrupting the digital data being fed to write head 15. Within each column of data, the width of a column is taken as a digital word. This width corresponds to the writing width of the head. The pitch of the lead screw and the rate of rotation of the drum are synchronized so that columns abut, edge to edge, without overlap or gap. Use of liquid toner allows edges to blend so that they are not discernible in the final image. Each ditigal word is transmitted in a flat electrical cable 138 to head 51. A digital word, consisting of say 1,024 bits is transmitted to the head. A source of high voltage applied to the head allows the binary bits to be converted to electrical charge transferred onto sheet 13 by the linear array of wires in the head. Paper to be written upon is treated with a dielectric substance for charge retaining purposes. Such papers are commercially available, for example "Electrographic Paper" sold by Crown Zellerbach Corporation.

After printing a series of columns, which appear to be helical stripes and then toning with a developer of a first color, the head is caused to fly back for a second pass. After this is complete, the head is caused to fly back for a third scan with developer of the third color. Finally, upon completion of this scan, the head is again caused to fly back and then again scan across the paper applying toner of the fourth color, the toner shoes having been indexed one after another underneath the head by screw 70 and motor 69. Toners associated with primary colors may be used to form a color printed image. After the fourth pass, paper is released from drum 11 by releasing vacuum in the channels 27 and 29 and by moving the pickoff fingers 139 into contact with the drum, thereby causing sheet 13 to slide over the pickoff fingers as indicated by the dashed arrows 141 and sheet 143. Passage of the sheet 143 past the pickoff fingers is sensed by an optical sensor 145. The pickoff fingers are moved by a solenoid 147 which can adjust the fingers to move into ejection position once printing is complete. Control panel 137 has various status indicators for signalling printing progress as well as manual override controls for interrupting printer operation or resetting the printing.

FIG. 3 shows a sheet 13 consisting of columns 151, 153, 155, 161 and so on. A page margin 157 exists on the left hand side and a page margin 159 exists on the right hand side. In these page margins, no printing exists. The area of the paper accessable for printing is desirably a multiple of the width of the head. In the example of FIG. 3, fourteen columns are shown, each column being the width of the head. To print sheet 13 fourteen revolutions of the drum per color would be necessary, with page margin columns 157 and 159 being blank since the head did not pass over these regions. The lateral motion of the head is smooth and continuous so that when the paper sheet is wrapped about the drum, the columns appear to be a continuous helical spiral, without any spaces or overlap in the spiral pattern.

FIG. 4 illustrates a printing sample within a column indicated by the dashed circle 4 in FIG. 3. In FIG. 4, the head and a toner shoe has moved over column 161 developing a latent image and this latent image has been toned to form a dot pattern 163, the dots appearing to be in rows and columns. The maximum number of dots possible equals the number of wire elements in the head extending from side to side. The dot pattern of FIG. 4 is merely illustrative of the writing of digital words with bit patterns which span a column from edge to edge. The bit patterns consist of the presence and absence of charge which is made visible by toning. Where charge is applied, the image is toned, giving a dark dot appearance. Since the charge is quite localized, the pattern appears to be a grid-like array of dots. Each position in the array is an image pixel which is either dark or light depending upon whether charge was deposited in an array location.

FIG. 5 shows that the head 15 consists of a series of very fine wires 160 deposited on a very thin circuit board 165. It is possible to use charging elements other than wires, but in this case wires present a manufacturing advantage. The wires extend completely across the board, on upper and lower surfaces. This is illustrated in FIG. 6 where the board 165 is seen end-on. It has an upper set of wires 167 and a lower set of wires 169. The board itself is only about 2.5 mils thick. The wires or charging elements are positioned at a density of more than 150 wires per centimeter or about 400 wires per inch, with 512 wires per side and an air or other insulative gap between adjacent wires so that they do not short each other out. As may be seen, the two sets of wires are slightly offset from each other, with a total of 1024 wires on two sides. This number is selected because it is convenient for digital processing. The wires 167 and 169 are parallel, mutually insulated traces which are plated onto board 165 using well-known photolithographic techniques. One of the advantages of the present invention is that the head used herein is relatively inexpensive compared to line printer heads and other full width electrostatic heads which are very expensive.

In FIG. 7, the drum 11 is seen to be rotating about axle 14 in the direction indicated by the arrow A. The diameter of drum 11 is approximately 12 inches and its width is wider than sheets to be supported. The surface of the drum, extending from slightly inside the region of where paper is to be supported may be slightly relieved to prevent edge wetting when using fluid developers. The drum may have a pair of vacuum channels 27 and 29 which are passages embedded in the drum having pumped apertures on the drum's surface for holding sheet 13. Preferably, the channels should be spaced so as to secure the top and bottom edges of a sheet. Channels 27 and 29 are evacuated by means of a vacuum pump, not shown.

The electrostatic head 15 is in mechanical contact with a paper sheet mounted on the drum, applying charge thereto. Head 15 and toner shoe assembly 18 are supported on a carrier assembly, not shown, which is connected to a lead screw. A toning shoe 17, having an arcuate peripheral shape facing the drum applies toner to a localized area corresponding to a column or a latent image stripe. The latent image created by the head 15 is thus toned and formed into a visible image.

The position of the toning shoe is one very closely spaced to sheet 13, being biased by single point biasing mechanism 32 of assembly 18. The single point biasing mechanism urges the shoe against the paper surface so that raised upstream and downstream rim support surfaces thereof are held against the paper on the drum. Toning shoe 17 is in communication with a supply of fluid developer via an inlet tube 26. Toner applied at the upper portion of the shoe 17 is allowed to flow downward along a central recessed area of the shoe between the sheet and the shoe, and then fall into a drain 22 at the bottom of shoe 17 into a sump 36 for collection through drain tube 24. New developer, supplied through the inlet tube 26, flows through the wall of the shoe to a manifold therein where the supply of developer is replenished and is injected into the shoe for application to the sheet. A drying roller 28 is seen to be carried within the same housing as the shoe and contacts drum 11 for removing excess developer. Once the excess is removed, it is scraped from the drying roller by a scraper blade 30. Again, excess developer falls into the sump 36 for collection and returning of the developer to the supply.

With reference to FIG. 8, an exploded detail of drum 11 is seen. An edge of the drum 12 may have a recessed shoulder 10 which is approximately one-quarter inch below the principal drum surface 16. The sheet of paper 13 overhangs the main drum surface 16 by a fraction of an inch. If the toning shoe 17 passes over overhanging portion 13, excess developer will run down the face of the shoe and avoid contact with drum 11. Without the presence of the recessed shoulder, developer could enter the small space between sheet 13 and drum 11 and by capillary action spread onto the back side of sheet 13 and onto the main drum surface, causing a buildup of toner on the drum. This could lead to deterioration of the drum surface, since a residue of toner particles would accumulate on the drum. The recessed shoulder portion 10 exists on opposite sides of the drum.

In FIGS. 9–11, a detail of a toning shoe is seen. The shoe has raised peripheral edges which include upstream and downstream support rims 72 and 74, respectively, and opposed lateral insulating rims 76 and 78. Within the boundary formed by the rims is a central recessed electrode 80. The support rims 72 and 74 are brought into contact with a sheet being scanned. A developer slit 82, defined in the shoe between an upper or leading edge of electrode 80 and upstream support rim 72, applies toner or fluid developer onto a charged sheet carrying a latent image stripe. The toning shoe communicates with a supply of developer through an inlet line 92 connected to the underside of the shoe. An inlet bore 94 formed in the shoe delivers developer from inlet line 92 to developer slit 82. A thin film of developer flows from developer slit 82 in the space defined between electrode 80 and the sheet to a drain channel 96, defined in the shoe between a lower or trailing edge of electrode 80 and downstream support rim 74. Drain ports 98 under the downstream support rim 74 permit residual excess developer to drain from the shoe to a location where it is collected for recycling.

Electrode 80 is typically 2 inches (5.08 cm) long and 2.56 inches (6.50 cm) wide. Each of the support rims 72 and 74 is typically about ¼ inch (0.64 cm) wide and 2.56 inches (6.50 cm) long. Each of the lateral rims 76 and 78 is typically about ⅜ inch (0.95 cm) wide and 3 inches (7.62 cm) long. The constructed toning shoe is thus typically about 3 inches (7.62 cm) long and 3.31 inches (8.41 cm) wide.

Support rims 72 and 74 contact and conform to the shape of the charge retentive sheet on the drum. Lateral rims 76 and 78 are relieved by about 0.1 to 0.2 mil (2.5 to 5.1 $\mu$m) so as to not quite touch the sheet. Lateral rims 76 and 78 may be relieved by as much as 2.0 mil (50.8 $\mu$m) yet still be sufficiently close to the sheet to confine the toner flow to a localized area adjacent electrode 80 with little leakage. Lateral rims 76 and 78 have an arcuate shape facing the drum with a radius of curvature which is approximately equal to the combined radius of the drum with sheet, typically about 5⅞ inches (14.9 cm). Electrode 80 is recessed in the toning shoe, relative to the support rims 72 and 74, thereby creating a space less than 10 mils (254 $\mu$m) deep for the flow of a thin film of developer adjacent to the sheet. Typically, electrode 80 is recessed about 5 mils (127 $\mu$m), with a tolerance of about 0.5 mil (12.5 m).

The toning shoe applies developer to a localized area corresponding to a latent image stripe on the sheet. Typically, developer is injected under pressure, about 1.5 psi, at a rate of 0.07 gallons per minute, and flows in a thin film at a speed of about 15 or 16 inches per second through the space between electrode 80 and the sheet. Central electrode 80 is normally a grounded conductor. Support rims 72 and 74 are also electrically conducting. Developing fluid flowing in the space between electrode 80 and a sheet is subject to an electric field in those regions where charge has been deposited onto the sheet, causing toner particles suspended in the developer to be attracted to the sheet thereby creating a visible image.

For a two-inch-long toning shoe 60, a sheet on the drum is in contact with developer for one-sixth second at maximum drum speed. Drum speeds as slow as two inches per second can cause sheet-developer contact times of as long as one second, which if not compensated for cause overtoning of the sheet, image running and smearing, and reduced resolution. A preferred compensation method is reduction of the toner flow rate so as to prevent overtoning. This is largely accomplished automatically by the pumping action of the moving drum. As the drum rotates more slowly, it drags less toner along with it, reducing the total toner flow.

Alternatively, the central electrode may be subject to a variable bias voltage to compensate for variable drum speed. At a typical maximum speed of rotation, 12 inches per second, a typical bias would be zero volts. As speed decreases negative bias increases linearly. At minimum speed, say 2 inches per second a typical bias is negative 75 volts. A bias voltage on the electrode portion 71 reduces the electric field in the space between electrode and sheet by an amount sufficient to prevent overtoning.

Lateral rims 76 and 78 approach, but don't quite touch, the sheet near opposed lateral boundaries of the latent image stripe. Although rims 76 and 78 confine developer substantially to the latent image stripe area, some leakage toner is always present between the shoe edge and the sheet. This leakage is unavoidable, even if the lateral rims were to contact the sheet in a close fit, due to the inherent roughness of the sheet surface. Since the lateral rims 76 and 78 are electrically insulating instead of electrically conducting, they do not act as electrodes. Conductive rims cause toning outside of the latent image stripe resulting in uneven toning visible as somewhat darker bands when producing large solid areas which are colored. In addition, since the lateral rims 76 and 78 are very slightly relieved from the sheet, triboelectric effects are greatly reduced. These effects may cause toner particles to be deposited onto the image directly or else deposited onto the rims and subsequently rubbed off onto the image. Both of these depositions lead to streaking or visible background staining of the image.

With reference to FIGS. 9-11, toning shoe 17 is biased against a sheet by a single point biasing mechanism 32. A detent 40 is provided in the back of toning shoe 17 for receiving a pin 62 of the biasing mechanism 32. Toning shoe 17 is also loosely secured to biasing mechanism 32 by screws 50, 52, 54 and 56. Extensions or tabs 42, 44, 46 and 48 extend out from shoe 17 and have holes 102, 104, 106 and 108 respectively. Screws 50, 52, 54 and 56 fit through holes 102, 104, 106 and 108 respectively and are partially inserted, i.e. screwed into respective holes in a base 58 of biasing mechanism 32. Screws are preferred because the amount of insertion can be adjusted. Alternatively, nails, rivets and the like can be used. The diameter of holes 102, 104, 106 and 108 should be larger than that of the shafts of the screws, but less than the diameter of the heads of the screws. This gives the toning shoe a degree of freedom to rotate about an axis, indicated by arrow $\theta$, generally perpendicular to the top surface of the shoe through detent 40. Toning shoe 17 is also free to rotate about two other axes, indicated by arrows $\phi$ and $\Psi$. The three axes $\theta$, $\phi$ and $\Psi$ are mutually orthogonal. These rotational degrees of freedom are discussed further below.

The screws 50, 52, 54 and 56 define a limit of forward movement of the shoe. Biasing mechanism 32 biases toning shoe 17 forward, i.e. against a sheet. The forward limit is reached when tabs 42, 44, 46 and 48 on toning shoe 17 reach the heads of screws 50, 52, 54 and 56. Since the head diameter is larger than the diameter of the holes 102, 104, 106 and 108, the toning shoe is prevented from moving beyond this limit. The limit is not ordinarily reached during operation when the shoe is scanning a sheet on a drum, but when, for example, the shoe is retracted for cleaning, the limit of forward movement defined by the screws prevents the toning shoe from falling off. Typically, this limit is about ¼ inch (6 mm) from base 58.

Biasing mechanism 32 comprises a base 58, a lever body 60 pivotally mounted to base 58, a pin 62 on one end of lever body 60 and a spring 64 for applying a torque to lever body 60 so as to push pin 62 against toning shoe 17. Lever body 60 is mounted to base 58 by an axle 66. Axle 66 connects to base 58 through opposing upwardly extending blocks 68, and to lever body 60 through tabs 93 adjacent to respective blocks 68. Spring 64 attaches to two downwardly depending tabs 99 and 100. Tab 99 is fixed to base 58. Tab 100 forms part of lever body 60 and is located on the opposite side of axle 66 from pin 62. Preferably, tab 100 is oriented downward and generally perpendicular to the portion of lever body 60 between axle 66 and pin 62. When spring 64 exerts a pulling force on tab 100, the lever body pivots so as to push pin 62 upwards against the back of toning shoe 17.

Typically, biasing mechanism 32 exerts a force of about four pounds (17.8 Newtons) against toning shoe 17. Pin 62 is typically ¼ inch (6 mm) long, the distance between pin 62 and axle 66 is typically about one inch (25 mm), and the distance between axle 66 and the point of spring connection to tab 100 is about ½ inch (13 mm) Spring 64 exerts a typical pulling force on tab 100 of about eight pounds (35.6 Newtons).

Toning shoe 17 has a normal orientation for seating against a sheet on a drum. As seen in FIG. 9, this normal orientation is askew relative to the drum's rotation axis, represented by line 84 in FIG. 9. Typically, developer slit 82 in toning shoe 17, which represents the leading edge for applying developer to a helical stripe of the sheet, is approximately four degrees askew relative to drum axis 84. Rims 72 and 74 of toning shoe 17 have a skewed arcuate shape so as to fit closely against a sheet on the drum when toning shoe 17 is in this askew normal orientation. Preferably, detent 40 is located near the center of fluid pressure of toning shoe 17, so that pin 62 supports the shoe in its normal orientation as on a balance. However, the precise location of detent 40 is not highly critical.

Toning shoe 17 is movable on pin 62 relative to the normal orientation with three degrees of freedom. Pin 62 thus acts as a gimbal for toning shoe 17. A first degree of freedom is rotation about an axis, indicated by arrow $\theta$, generally perpendicular to the top surface 36 of shoe 17 through detent 40, as seen in FIGS. 9-11. Toning shoe 17 may rotate either clockwise for increased skew or counterclockwise for decreased skew, as indicated by arrows 86 in FIG. 9. A phantom toning shoe 88 is seen in FIG. 9 which is rotated counterclockwise up to the maximum allowable limit of motion. This limit may range from 0.1 to four degrees away from the normal orientation but is typically about one or two degrees away from the normal orientation.

A second degree of freedom of movement is rotation on an axis $\phi$ parallel to the rotation axis of the drum about pin 62. This axis is indicated by arrow $\phi$ in FIGS. 9 and 10. The toning shoe may rotate either toward a more inclined orientation, or toward a less inclined orientation, In either case, the toning shoe is movable up to a maximum limit in the range from one to eight degrees with respect to the normal orientation. This limit is typically about five degrees.

A third degree of freedom of movement is rotation on an axis, indicated by arrow 105 in FIGS. 9-11, tangent of the circumference of the drum about pin 62 in the direction of drum rotation. The toning shoe may thus rotate toward a leftward orientation. In this leftward orientation, tabs 46 and 48 are lower on their screws 54 and 56, i.e. are closer to base 58, than the other two tabs 42 and 44 shown in FIG. 9. The toning shoe may also rotate toward a rightward orientation, in which tabs 46 and 48 are further from base 58 than tabs 42 and 44. As with the first two rotational degrees of freedom about axes $\theta$ and $\phi$, the toning shoe is movable about axis $\Psi$ up to a maximum limit with respect to the normal orientation. Again, as with rotation about axis $\phi$, this limit is typically about five degrees.

The toning shoe 17 described above is movable simultaneously in all of the rotational degrees of freedom about three mutually orthogonal axes through the single point of biasing so as to be responsive to the local orientation of the sheet on the drum. This occurs automatically as the biasing mechanism 32 biases the shoe against the sheet. Thus the shoe is self-seating, and helical scanning is made possible without loss of image quality.

With reference to FIG. 12, the toning shoe is assembled from a frame 110, a separate electrode 80 and two insulating blocks 76 and 78 forming the lateral rims. The frame 110 is a single piece of metal, such as steel, which incorporates the upper and lower support rims 72 and 74 respectively, the corner tabs 42, 44, 46 and 48, and flat, horizontal surfaces 112, 114 and 116 for mounting electrode 80 and insulating blocks 76 and 78. These surfaces contain holes 118 for screw mounting the insulating blocks 76 and 78 and electrode 80 to frame 110. Frame 110 also contains the inlet bore 94 seen in FIG. 11 and drain ports 98. The drain slot 96 and developer slit 82 seen in FIG. 11 consist of gaps between electrode 80 and frame 110. The insulating lateral rims 76 and 78 are typically made of blocks of a glass/epoxy composite. The electrode 80 is a separate, inlaid piece of electrically conductive material which rests on flat surface 112.

To make the shoe, the parts 110, 76, 78 and 80 are first assembled completely with a 5 mil thin shim 120 under electrode 80. Shim 120 raises electrode 80 just 5 mils higher than it would otherwise be. Lateral rim blocks 76 and 78 are secured to flat surfaces 114 and 116 respectively by three insulative screws 122 each placed through holes 124 in the blocks and screwed into holes 118 in flat surfaces 114 and 116. Electrode 80 is secured in the cavity, defined by support rims 72 and 74 and lateral rim blocks 76 and 78, by two screws 126 placed through holes 128 in electrode 80, holes 130 in shim 120 and screwed into holes 118 in flat surface 112.

After the first assembly, all of the upper surfaces of support rims 72 and 74, lateral rim blocks 76 and 78, and electrode 80 are lapped to fit the drum curvature. These surfaces may also be machined, ground or otherwise formed so as to fit the drum curvature. The lapping medium is slightly resilient, and since the glass/epoxy lateral rim blocks 76 and 78 are somewhat softer than the steel frame 110, these blocks lap a little faster causing them to be relieved by about 0.1 mil below the support rims 72 and 74. When the lapping is completed, electrode 80 is unscrewed and shim 120 is removed. The electrode 80 is then replaced onto flat surface 112 without the shim and secured by screws 126 leaving the electrode surface recessed by the exact 5 mil depth which is required. Thus, the toning shoe can be made easily without the need to hold any of the parts to close tolerance. Alternatively, screws 122 and 126 may screw in through the frame 110 from below leaving all the upper shoe surfaces smooth and continuous.

With reference to FIG. 13, a toning shoe 17 may selectively communicate with each of four color developers by means of a manifold 161 and four valves 152, 154, 156 and 158. A rinsing solvent may also be supplied to toning shoe 17 via a valve 151 and manifold 161. For example, a first supply line 142 may communicate with a supply of yellow developer, a second supply line 144 may communicate with a supply of magenta developer, a third supply line 146 may communicate with a supply of cyan developer and a fourth supply line 148 may communicate with a supply of black developer. Supply line 150 may communicate with a supply of solvent, such as ISOPAR. Valves 152, 154, 156, 158 and 151 connect to supply lines 142, 144, 146, 148 and 150 respectively and control which developer or solvent is delivered to toning shoe. These valves correspond to valves 125, 127, 129 and 131 in FIG. 2. Lines 153, 155, 157, 159 and 149 connect valves 152, 154, 156, 158 and 151 respectively to manifold 161. Manifold 161 has a common channel 163 which delivers the developer to an inlet line 92 and thence to toning shoe 17. All tubing, which form the lines, and passages in manifold 161 have an interior diameter of about 1/16 inch (1.6 mm).

With reference to FIGS. 14 and 15, a drain selector foot 38 selects a drain tube 20a, b, c or d for returning used developer to the correct supply tank. Foot 38 is pivoted about a pivot or ankle 162 at an end of foot 38 in an either counterclockwise or clockwise direction, as indicated by arrows B and C respectively. The position of foot 38 is detected by sensors 164. Sensors 164 may be optical sensors consisting of a light transmitter and a detector, separated by a narrow space. When the light beam is interrupted, as by a flag 166 depending from foot 38 passing through a sensor, the sensor is activated and the position of the foot is known.

Pivoting foot 38 brings one of four openings 168 through foot 38 into line directly beneath the drain tube 24 of toning shoe assembly 18. Used developer flows in the direction of arrows 170 and 172 from drain tube 24 through an opening 168, and through a recycling tube, such as tube 20b, back to a supply tank. Drain tub 24 is pointed like a quill to prevent drops of developer therein from staying in the drain tube 24. Each of the openings 168 connects to a toner recycling tube 20a, b, c or d leading back to developer supply tanks.

Foot 38 is driven into a selected position for returning developer to the appropriate supply tank by peg disc drive 174 powered by a servo motor 176 through a shaft 178. Peg disc drive 174 comprises a disc 180 and four upstanding pegs 182 projecting upwardly from disc 180. Motor 176 receives commands from a control box, such as box 135 seen in FIG. 2. Foot 38 has a plurality of toes 184, typically six in number, which extend from an end of foot 38 opposite ankle 162. The toes define spaces 186, typically five in number, between toes 184. These spaces receive pegs 182. Preferably, pegs 182 are arranged on disc 180 in a square so that every turn of ninety degrees by disc 180 brings new peg into engagement with a space 186 between toes 184. Peg disc drive 174 can turn either clockwise or counterclockwise, as indicated by arrow D. Turning drive 174 clockwise forces the lower left peg engaging foot 38 in FIG. 14 to push against a toe causing foot 38 to pivot in counterclockwise direction B. Likewise, turning drive 174 counterclockwise pivots foot 38 in clockwise direction C. Each ninety degree turn of drive 174 brings a different opening 168 into position beneath drain tube 24.

With reference to FIG. 16, a cleaning station 134 receives a cleaning solvent indicated by arrows 188 and 190, from a solvent supply tube 132 which divides into two solvent supply tubes 132a and 132b and connects to back surface 192 of cleaning station 134 at two places 194 and 196. Channels 198 and 200 through cleaning station 134 transport solvent from supply tubes 132a and 132b to the front surface 202 of cleaning station 134. Front surface 202 is shaped to conform to a toning shoe, such as shoe 17 seen in phantom in FIG. 16. Front surface 202 is also shaped at bottom region 204 to receive drying roller 28. A ridge 206 separates the top region of front surface 202 for rinsing toning shoe 17 from bottom region 204 for rinsing roller 28. Channels 198 and 200 may incorporate cross channels, not shown, and a plurality of outlet openings in front surface 202 to more effectively spread the cleaning solvent across the width of the shoe 17 and drying roller 28.

In operation, with reference to FIGS. 1, 13 and 16, when toning shoe assembly 18 completes a scan of sheet 13 on drum 11, the color valve 152, 154, 156 or 158 is turned off. The appropriate developer pump, corresponding to pump 115, 117, 119 or 121 in FIG. 2, is also turned off. Toning shoe assembly 18 is then retracted from the sheet and advanced past the end of drum 11 to cleaning station 134. Toning shoe 17 engages cleaning station 134, valve 151 is opened and a cleaning solvent, such as ISOPAR, is pumped to toning shoe 17. The valve 152, 154, 156 or 158 corresponding to the previously delivered color, is again opened for about 0.1 sec to push colored fluid back from the common channel 163. Solvent is delivered through inlet line 92 as well as channel 198 to rinse the toning shoe 17. Rinsing typically lasts for about 3 seconds. An abundance of solvent flows in space 208 between electrode 80 and front surface 202. Preferably, enough solvent is flowing to lift toning shoe 17 slightly so as to also rinse support rims 72 and 74, as well as the lateral rims, not shown. The excess solvent flows into drain ports 98, and spills into funnel 136, as indicated by arrows 210, for return to the solvent supply tank. At the same time as toning shoe 17 is rinsed, drying roller 28 and wiper blade 30 are also rinsed with solvent from channel 200. Excess solvent also falls into funnel 136. After rinsing, valve 151 is turned off, and toning shoe assembly 18 is disengaged from cleaning station 134 and returned to drum 11 for a new scan. After the last scan of a sheet, the toning shoe may be left engaged against cleaning station 134 until the printer is next used. Printers with four toning shoes, as in FIG. 2, do not require a cleaning station and may be wiped clean periodically.

While the invention has been described with reference to developing of electrostatic latent images produced by wires or conductive tracks, the same structure may be easily adapted for developing electrostatic latent images on substrates, with latent images having been produced by other means such as ionographic writing or by electrophotographic means as in xerography. Still other applications may involve development of photographic latent images with fluid developer.

We claim:

1. A method of forming a toning shoe comprising,
   creating a frame with opposed upstream and downstream support rims, a central flat surface between said support rims and a pair of lateral flat surfaces bounding said central flat surface,
   mounting two electrically insulating blocks to said pair of lateral flat surfaces,
   disposing a shim on said central flat surface, and mounting an electrically conductive electrode over said shim to said central flat surface, said shim being less than ten mils thick,
   lapping top surfaces of said support rims, said insulating blocks, and said electrode to a predetermined curvature, said insulating blocks being lapped to a greater extent than said support rims so as to be relieved relative to support rims by a depth of less than two mils, removing said shim and said electrode from said central flat surface, and mounting said electrode onto said central flat surface, said electrode being recessed relative to said support rims by a depth of less than ten mils.

2. A toning shoe for use in an electrostatic printer comprising a frame having opposed upstream and downstream support rims, a central flat surface between said support rims and a pair of lateral flat surfaces bounding said central flat surface, said support rims adapted for frictional contact with a surface bearing a latent image, two electrically insulating blocks mounted on said lateral flat surfaces to form lateral rims, said lateral rims being relieved relative to said support rims by a depth of less than two mils, and an electrically conductive electrode mounted to said central flat surface, said electrode having an arcuate developer surface distal to the attachment to said central flat surface, said developer surface having an upstream edge adjacent said upstream support rim and having a downstream edge adjacent said downstream support rim, said edges recessed relative to said support rims by a depth of less than ten mils, a slit being defined between said upstream support rim and said electrode and being in communication with a supply of fluid developer, a drain channel being defined between said downstream support rim and said electrode, and at least one drain port being defined in said downstream support rim in communication with said drain channel, the support rims, the lateral rims and the arcuate developer surface delimitating an area for the flow of fluid developer.

3. The toning shoe of claim 2 wherein said surface bearing a latent image is a sheet supported on a drum, said arcuate developer surface of the electrode having a radius of curvature substantially equal to the radius of the drum plus the sheet thickness.

4. The toning shoe of claim 2 wherein said means for providing frictional contact comprises, a base at a fixed distance from said surface bearing a latent image, said frame having four corner tabs loosely connected to said base, a lever body pivotally mounted to said base, a pin on one end of said lever body contacting a back of said frame at a single point thereof, and means for applying a torque to said lever body to cause said pin to push against the shoe.

5. The toning shoe of claim 2 wherein said arcuate developer surface has a surface area dimensioned to develop a latent image in a scanning manner to form a helical pattern.

6. The toning shoe of claim 2 wherein said frame is a unitary member made of an electrically conductive material.

7. The toning shoe of claim 2 wherein the support rims, the lateral rims and the arcuate developer surface combine to form a concave shape having raised and recessed areas relative to said flat central surface of the frame, yet having a single radius of curvature.

* * * * *